(12) United States Patent
Lange

(10) Patent No.: US 6,467,921 B2
(45) Date of Patent: Oct. 22, 2002

(54) CONTROL UNIT HAVING CONTROL ELEMENTS WHICH CAN BE ILLUMINATED

(75) Inventor: Michael Lange, Wiesbaden (DE)

(73) Assignee: Siemens VDO Automotive AG, Frankfurt (DE)

( * ) Notice: Subject to any disclaimer, the term of this patent is extended or adjusted under 35 U.S.C. 154(b) by 0 days.

(21) Appl. No.: 09/731,334

(22) Filed: Dec. 6, 2000

(65) Prior Publication Data

US 2001/0014023 A1 Aug. 16, 2001

(30) Foreign Application Priority Data

Dec. 6, 1999 (DE) .......................................... 199 58 725

(51) Int. Cl.[7] .............................................. G01D 11/28
(52) U.S. Cl. .......................... 362/29; 362/511; 362/558; 362/31; 362/30
(58) Field of Search .............................. 362/23, 26, 27, 362/29, 31, 85, 555, 511, 558, 24, 30; 116/286, 287, 288

(56) References Cited

U.S. PATENT DOCUMENTS

| 4,079,242 A | * | 3/1978 | Seibel | 362/577 |
|---|---|---|---|---|
| 4,779,166 A | * | 10/1988 | Tanaka | 362/31 |
| 4,930,048 A | | 5/1990 | Ito | 362/26 |
| 6,158,867 A | * | 12/2000 | Parker | 362/29 |
| 6,247,826 B1 | * | 6/2001 | Funamoto | 362/31 |
| 6,264,343 B1 | * | 7/2001 | Miyashita | 362/31 |

FOREIGN PATENT DOCUMENTS

| DE | 87 02 558.2 | 2/1987 | B60R/16/02 |
|---|---|---|---|
| DE | 35 35 881 C2 | 4/1987 | G09F/9/30 |
| DE | 4106322 A | 2/1996 | B60Q/3/04 |
| DE | 19742309 A1 | 1/1999 | B60N/2/02 |
| EP | 0 498 451 A1 | 12/1992 | B60Q/3/04 |
| FR | 1.598.519 | 6/1970 | |
| JP | 11261990 A | * 9/1999 | |

\* cited by examiner

Primary Examiner—Sandra O'Shea
Assistant Examiner—Hargobind S. Sawhney
(74) Attorney, Agent, or Firm—Mayer, Brown, Rowe & Maw

(57) ABSTRACT

The invention relates to a control unit of a motor vehicle having a plurality of control elements (2, 3) arranged in a visible surface of the control unit, at least one of which elements can be illuminated by a light source (18) via a light coupling-out area of an annular optical waveguide (16). The invention provides for the optical waveguide (16) to have a closed annular form with a tangential bulge (17) which forms a light coupling-in area perpendicularly to the annular light coupling-out area. In a second embodiment for illuminating a plurality of control elements, provision is made of an optical waveguide having a plurality of light coupling-out areas arranged in the same plane on finger-like extensions of an otherwise planar optical waveguide, the light coupling-out areas being arranged at right angles to a common light coupling-in area.

13 Claims, 3 Drawing Sheets

CONTROL UNIT HAVING CONTROL ELEMENTS WHICH CAN BE ILLUMINATED

BACKGROUND OF THE INVENTION

1. Field of the Invention

The invention relates to a control unit of a motor vehicle having a plurality of control elements arranged in a visible surface of the control unit, at least one of which elements can be illuminated by a light source via a light coupling-out area of an annular optical waveguide. Furthermore, the invention relates to a control unit of a motor vehicle having a plurality of control elements arranged in a visible surface of the control unit, which elements can be illuminated by a light source via light coupling-out areas of an optical waveguide.

2. Description of the Related Art

Control units of a motor vehicle, such as e.g. those for an air-conditioning system or a navigation system, have a plurality of control elements. In order to ensure reliable control of the control units even at night, the control elements must be able to be reliably recognized even when it is dark. The control elements can be visually identified e.g. by the control element itself containing a luminous marking or, alternatively, by a luminous ring being arranged around the control element. Since the space behind the control element in the control unit is generally occupied by the component actuated by the control element, such as e.g. a potentiometer, use is often made of optical waveguides which guide the light from a light source to the desired location in the control unit. At the same time, it is also necessary to ensure uniform illumination.

The light sources used are generally a plurality of light-emitting diodes which are arranged on a printed circuit board in the control unit and whose light emission takes place perpendicularly to the plane of the printed circuit board. Although the emission from the light-emitting diodes takes place, in principle, in the direction of the visible control surface of the control unit, the light-emitting diodes cannot be arranged directly behind the element to be illuminated, for the reasons mentioned above. Moreover, such a direct arrangement of the light-emitting diodes, e.g. in the case of the illumination of a control element by means of luminous rings would also lead to non-uniform light distribution. For this reason, too, the light emitted by the light-emitting diodes is coupled into an optical waveguide and guided via the latter to the desired location. In order to keep the loss of light low in this case, it is necessary to adhere to sufficiently large radii of the optical waveguide for light deflection. This results in correspondingly large installation depths of the control unit.

FIG. 6 illustrates such a known arrangement according to the prior art. A control element 63 is arranged in a visible front face 61 of a housing 62. The control element 63 is surrounded by a luminous ring formed by the light-guiding element 64. Furthermore, a printed circuit board 65, to which a light-emitting diode 66 is applied, is arranged in the housing 62. The light-emitting diode 66 emits light in the direction of the front face 61. However, on account of the installation conditions, the said diode is arranged laterally offset with respect to the control element 63 in the printed circuit board 65. Light is coupled into the light-guiding element 64 via an arc segment 67. This structure results in the control unit having a relatively large physical depth.

EP 0 498 451 A1 discloses a motor vehicle indicating instrument which can be illuminated. An incompletely closed annulus is provided therein for the purpose of illuminating the indicating instrument, the light source being arranged in the missing part of said annulus. On account of the different installation conditions in the case of a relatively large indicating instrument in comparison with a relatively small control element, this solution cannot readily be applied to control elements. This is true particularly because the installation space directly behind the control element is not always available for fitting the light source.

SUMMARY OF THE INVENTION

An object of the invention, therefore, is to specify a control unit of a motor vehicle having control elements which can be illuminated, which control unit has a small installation depth and, at the same time, ensures homogeneous light distribution, in particular so-called "hot spots", i.e. points of high luminance being avoided.

It will be understood by those skilled in the art that the reference to "annular" includes oval forms as well.

The 1st exemplary embodiment comprises a solution for illuminating an individual, in particular a round, control element. The control element can be illuminated via an annular optical waveguide which essentially encloses the control element in the control surface. According to the invention, the optical waveguide has a closed annular form, the optical waveguide having a tangential bulge which forms a light coupling-in area perpendicular to the annular light coupling-out area. A physical depth which is reduced compared with the known embodiments is obtained as a result of this configuration. Compared with the solution embodiment which is known from instrument illumination, the invention has the advantage that the light source can be arranged offset laterally with respect to the control element, or the indicating instrument in the known embodiment. Consequently, the installation space behind the control element can be fully utilized for the actual element to be controlled, e.g. a potentiometer. In particular, the light coupling-out area of the annular optical waveguide is arranged essentially in a positively locking manner in the visible surface of the control unit and encloses the control element. This results in the control unit having a largely flat front face from which merely the control element itself projects.

In order to achieve a targeted coupling of light into the optical waveguide without scattered light occurring to an unnecessary extent, provision is made, in particular, for a light source having a single, directed light coupling-out area to be used. This may involve, in particular, a light-emitting diode. In order also still to be able to arrange a printed circuit board—on which the light-emitting diode is arranged—essentially parallel to the housing front face of the control unit, it is furthermore provided that the single light exit area of the light source is arranged perpendicularly to an area of the light source with electrical contact elements which establish the connection to the printed circuit board.

In a 2nd embodiment of the invention, it is provided that a plurality of control elements can be illuminated via an optical waveguide. In this case, the optical waveguide has a plurality of light coupling-out areas which are arranged in the same plane and are arranged on finger-like extensions of an otherwise planar optical waveguide. In this case, the light coupling-out areas are arranged at right angles to a common light coupling-in area. A very small installation depth can once again be obtained with such an optical waveguide as well. In particular, in this case as well, a light source having a single, directed light coupling-out area is again used in order to keep the proportion of scattered light as low as possible. In particular, the light source may therefore be a light-emitting diode. In order to be able to arrange a printed circuit board in the customary manner parallel to the front face of the control unit in this embodiment as well, the light source being arranged on the printed circuit board, in this case as well it is provided, in particular, that the single light exit area of the light source is arranged perpendicularly to an area of the light source with electrical contact elements which establish the connection to the printed circuit board.

BRIEF DESCRIPTION OF THE DRAWINGS

The invention is explained in more detail below with reference to exemplary embodiments and the drawing, in which.

DETAILED DESCRIPTION OF THE PREFERRED EMBODIMENT

Figure 1:
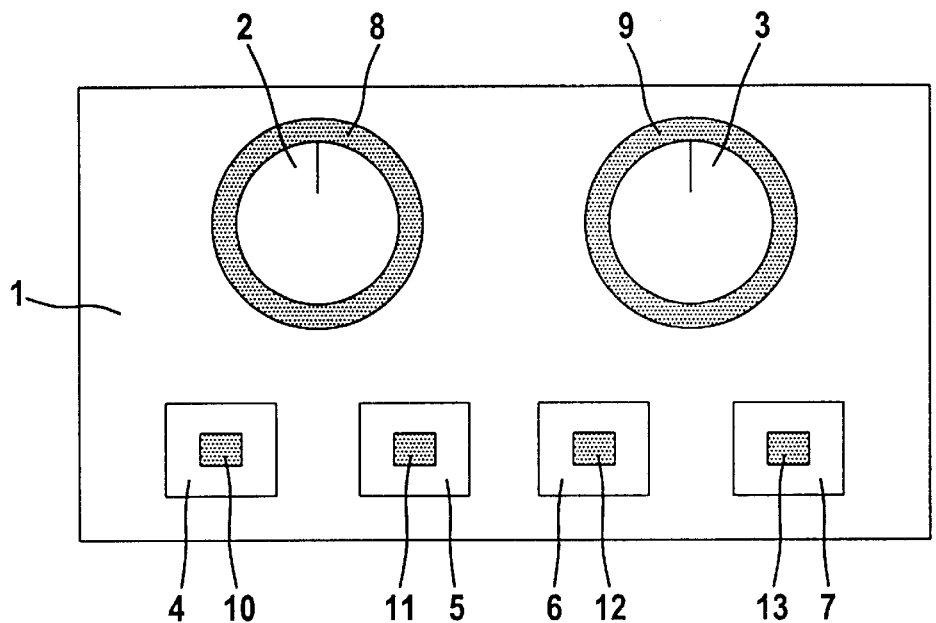
FIG. 1 shows a front view of a control unit.

FIG. 1 shows the front face 1 of a control unit, said front face being visible in the vehicle. Rotatable control elements 2, 3 and also buttons 4–7 are arranged in the front face 1 of the control unit. The rotatable control elements 2, 3 are surrounded by luminous areas 8, 9, which ensure that the control elements 2, 3 can be recognized even when it is dark. In the case of the buttons 4–7, luminous markings 10–13 are arranged in the button itself.

Figure 2:
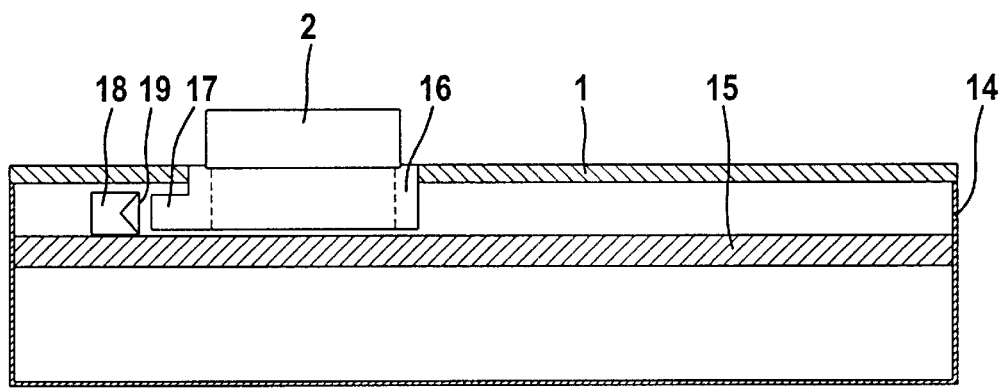
FIG. 2 shows a sectional view through a control unit with annular illumination of a control element.

FIG. 2 shows a simplified section through a control unit having a rotatable control element 2. The control unit is enclosed by a housing 14 having a front face 1 toward the passenger compartment. A printed circuit board 15 is arranged parallel to the front face 1 in the housing 14. An optical waveguide 16 having an annular form is integrated in the front face 1. The optical waveguide 16 has a tangential bulge 17, via which light is coupled into the optical waveguide. The light source that is present is a light-emitting diode 18 arranged on the printed circuit board 15. The light exit area 19 of the optical waveguide 18 is arranged perpendicularly to the plane which contains the electrical contact elements and which faces the printed circuit board 15. Consequently, in the embodiment according to the invention, the light-emitting diode 18 is arranged laterally with respect to the optical waveguide 16, a small installation depth thereby being realized.

Figure 4:
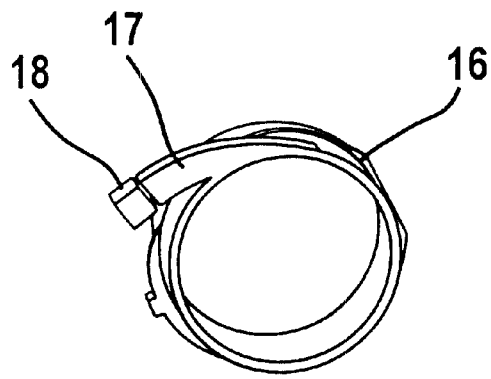
FIG. 4 shows an annular light-guiding element according to the invention.

The optical waveguide 16 is illustrated in more detail in FIG. 4. It is a closed annular optical waveguide having a tangential bulge 17 which is directed radially outward and contains the light coupling-in area. Light is coupled out via one of the ends of the annular optical waveguide. The arrangement of the light-emitting diode 18 is additionally illustrated in FIG. 4. This illustration reveals that the installation depth through the arrangement of the light-emitting diode 18 on the bulge 17 is not greater than the depth of the optical waveguide itself. Since the transition of the light from the bulge 17 into the annular part of the optical waveguide takes place at a shallow angle, the loss of light in the optical waveguide can be kept very small. Moreover highly homogeneous illumination of the annular optical waveguide is obtained.

Figure 3:
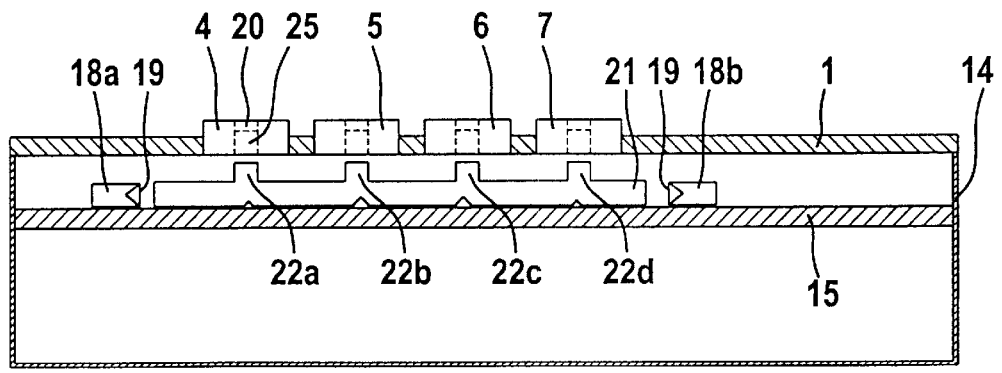
FIG. 3 shows a sectional view through a control unit with a plurality of illuminated buttons.

FIG. 3 illustrates a simplified section through a control unit in accordance with the 2nd embodiment. The control unit once again has a housing 14 bounded by the front face 1 toward the interior of the vehicle. A plurality of buttons 4–7 are arranged in the front face 1. As is explained using the example of the button 4, the buttons each have a central cutout 25 closed off by a translucent covering 20 toward the passenger compartment. A printed circuit board 15 is arranged parallel to the front face 1 of the housing 14 in the control unit. The buttons 4–7 are illuminated via a common optical waveguide 21, into which the light from two light-emitting diodes 18a and 18b is coupled. The light-emitting diodes 18 are fixed on the printed circuit board 15, the light exit area 19 being arranged perpendicularly to the printed circuit board 15. The electrical contact elements of the light-emitting diodes 18 are likewise arranged in a plane perpendicularly to the light exit area 19. The optical waveguide 21 is configured as a planar optical waveguide with finger-like extensions 22. The finger-like extensions 22 have the light coupling-out areas which are arranged perpendicularly to the light coupling-in areas. As emerges from FIG. 3, it is also the case in this configuration of the invention that the installation depth is not increased beyond the installation depth of the optical waveguide as a result of the arrangement of the light source with respect to the optical waveguide. In a departure from the illustration of the exemplary embodiment, the finger-like extensions 22 may, in particular, extend right into the respective central cutout 21.

Figure 5:
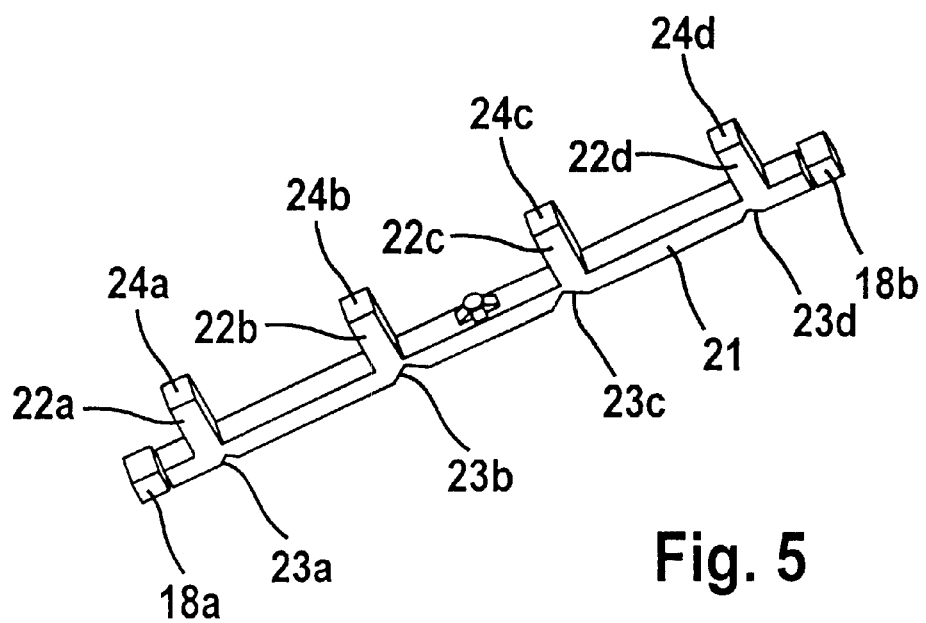
FIG. 5 shows a light-guiding element for illuminating a plurality of control elements.
Figure 6:
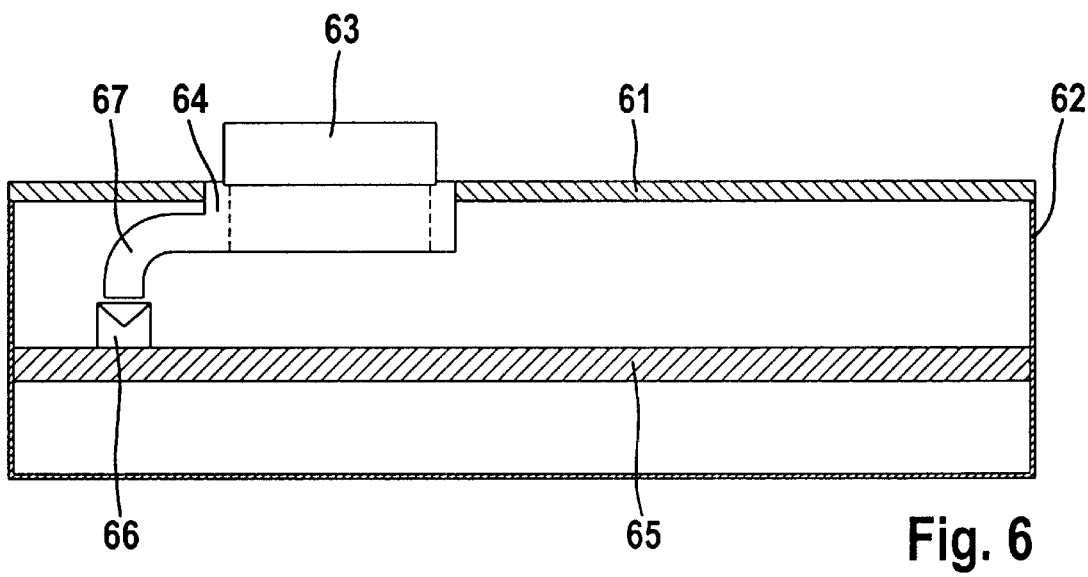
FIG. 6 shows a section through a control unit according to the prior art.

The optical waveguide 21 is shown in more detail in FIG. 5. The arrangement of two light-emitting diodes 18a and 18b is also illustrated. The optical waveguide 21 has finger-like extensions 22a–22d and also reflecting areas 23a–23d, which provide for light deflection to the light coupling-out areas 24a–24d. The light deflecting areas 23 are formed for example by notches in the optical waveguide 21. In the example illustrated, the light from the light-emitting diode 18a is guided to the light coupling-out areas 24a and 24b, while the light from the light-emitting diode 18b is guided to the light coupling-out areas 24b and 24c. In order to obtain a uniform luminance at the various light coupling-out areas, the reflecting areas are made larger with increasing distance from the corresponding light-emitting diode. It is also the case in this embodiment shown that the installation depth is not increased further by the arrangement of the light-emitting diodes 18 with respect to the optical waveguide 21.

What is claimed is:

1. A control unit of a motor vehicle comprising:
a plurality of control elements arranged in a surface of a control unit, at least one of the control elements illuminated by a light source via a light coupling-out area of an annular optical waveguide, wherein the optical waveguide has a closed annular form with a tangentially extending bulge which forms a light coupling-in area.

2. The control unit as claimed in claim 1, wherein the light coupling-out area of the annular optical waveguide encloses the control element.

3. The control unit as claimed in claim 1, wherein the light source has a single light coupling-out area.

4. The control unit as claimed in claim 3, wherein the light source is a light-emitting diode.

5. The control unit as claimed in claim 1, wherein the light source is fixed on a printed circuit board and the printed circuit board is arranged in a plane parallel to a plane of the annular optical waveguide.

6. The control unit as claimed in claim 5, wherein a single light exit area of the light source is arranged perpendicularly to an area of the light source with electrical contact elements which establish the connection to the printed circuit board.

7. The control unit as claimed in claim 1, further comprising an additional optical waveguide which has a plurality of light coupling-out areas arranged in a same plane on finger-like like extensions of an otherwise at least substantially planar optical waveguide, the light coupling-out areas being arranged at right angles to a common light coupling-in area.

8. A control unit of a motor vehicle comprising:

plurality of control elements arranged in a surface of the control unit, the control elements illuminated by a light source via light coupling-out areas of an optical waveguide, wherein the optical waveguide has a plurality of light coupling-out areas arranged in the same plane on the extensions of the planar optical waveguide, the plane of the light coupling-out areas parallel to that of the optical waveguide, the light coupling-out areas being arranged at least substantially at right angles to a common light coupling-in area wherein the light source is fixed on a printed circuit board arranged in a plane parallel to light exit areas of the optical waveguide and wherein the single light coupling-out area of the light source is perpendicular to an area of the light source with electrical contact elements which establish a connection to the printed circuit board.

9. The control unit as claimed in claim 8, wherein the optical waveguide has a reflecting area opposite the light coupling-out areas.

10. The control unit as claimed in claim 8, wherein the light source has a single light coupling-out area.

11. The control unit as claimed in claim 10, wherein the light source is a light-emitting diode.

12. A control unit of a motor vehicle comprising:

a control panel having a top surface;

a circuit board having an illumination element located opposite the top surface of the control panel;

a control element arranged on the top surface;

a light coupling-out area having an annular optical wave guide surrounding the control element, wherein the optical wave guide has an annular bulge in optical contact with the illumination element.

13. A control unit of a motor vehicle comprising:

a plurality of control elements arranged in a surface;

a rigid optical wave guide with a plurality of light coupling-out areas arranged in a same plane on extensions of an otherwise planar optical wave guide;

a light source illuminating the control elements via light coupling-out areas of an optical wave guide; and wherein the light coupling-out areas are arranged substantially at right angles to a common light coupling-in area.

* * * * *